United States Patent Office 3,053,806
Patented Sept. 11, 1962

3,053,806
ACRYLONITRILE- AND VINYL CHLORIDE-CONTAINING POLYMERS AND FIBROUS ARTICLES THEREOF
Edward M. La Combe and Andrew T. Walter, Charleston, W. Va., assignors to Union Carbide Corporation, a corporation of New York
No Drawing. Filed Dec. 29, 1960, Ser. No. 79,168
18 Claims. (Cl. 260—49)

This invention relates to novel solid polymers containing polymerized acrylonitrile and vinyl chloride together with an acryloxyalkoxyarylsulfonic acid compound. This invention also relates to polymers containing the three above monomers with one or more other polymerizable monomers. Further, this invention also relates to fibrous articles of said polymers.

The novel polymers of this invention can be used to produce films, as protective coatings, to produce shaped, molded and extruded articles, and other applications well known to the skilled scientist in the art. The fibrous articles produced from the novel polymers can be used to produce textiles, etc.

Polymers containing polymerized acrylonitrile and polymerized vinyl chloride ether as the sole polymerized monomers or polymerized with other monomers are well known. However, the polymers produced and known to this date produce fibers which are difficult to dye, and most often the fibers do not have sufficient dye affinity to enable dyeing by the conventional dyeing techniques. In many instances the dyes so applied are not light fast or stable to laundering and dry cleaning steps.

The most frequently proposed solution to improving the dyeability of acrylonitrile- and vinyl chloride-containing fibers with disperse and acid dyestuffs has been that of incorporating a basic monomer, such as methylvinylpyridine. Such monomers do improve the dye receptivity of the fibers to a substantal degree; however, they also cause undesirable effects. For example, the color stability at elevated temperatures is seriously impaired, as is the light stability of the dyed fabrics. In other instances the added monomer or monomers will lower the softening point of the polymer. Other methods for improving the dyeability of the fibers have involved the production of graft copolymers, admixing a second polymer or other additive with the fiber forming polymer, or subsequent treatment of the polymer before or after it is spun into fiber. All of these processes, however, achieve the improvement in dyeability at a sacrifice either in some fiber property or through an increase in the complexity of the procedures used in the production of either the polymers or the fibers.

It has now been found that polymers containing in the molecule from about 35 to 75 percent by weight of polymerized acrylonitrile, from about 10 to 60 percent by weight of vinyl chloride, and from about 0.5 to 10 percent by weight of a polymerized acryloxyalkoxyarylsulfonic acid compound, wherein the sum of all of the copolymerized monomers is 100 percent, can be produced. In addition, the polymers can contain one or more additional polymerizable monomers, such as, for example, vinylidene chloride, vinyl acetate, and the like, at concentrations ranging from about 5 to 20 percent by weight. In a preferred embodiment of this invention the concentration of polymerized acrylonitrile in the molecule is from about 60 to 75 percent by weight, of polymerized vinyl chloride from about 20 to 39 percent by weight and of polymerized acryloxyalkoxyarylsulfonic acid compound from about 1 to 10 percent by weight, with the most preferred concentration of polymerized acryloxyalkoxyarylsulfonic acid compound being from about 1 to 3 percent by weight, the sum of the copolymerized monomers in all cases being 100 percent.

The acryloxyalkoxyarylsulfonic acid compounds are represented by the general formula:

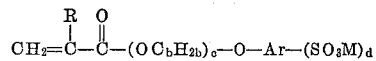

wherein R represents a hydrogen atom or a methyl radical; Ar represents a phenylene radical or a naphthylene radical; M represents a cation, such as, a hydrogen atom, an ammonium radical ($-NH_4$) or a monovalent alkali metal, such as lithium, sodium, potassium, rubidium or cesium; $b$ is an integer having a value of from 1 to about 3; $c$ is an integer having a value of 1 or 2; and $d$ is an integer having a value of 1 or 2. Preferably $d$ has a value of 1 when Ar is a phenylene radical, and a value of 1 or 2 when Ar is a naphthylene radical. It is also possible that the Ar radical is substituted with other radicals, for example lower alkyl, halogen, lower alkoxy, cyano, and the like.

Illustrative of the acryloxyalkoxyarylsulfonic acid compounds, in their free acid forms, are:

Ar-(acryloxymethoxy)benzenesulfonic acid,
Ar-(methacryloxymethoxy)benzenesulfonic acid,
Ar-(acryloxymethoxy)naphthalenesulfonic acid,
Ar-(acryloxymethoxy)naphthalenedisulfonic acid,
Ar-(2-acryloxyethoxy)benzenesulfonic acid,
Ar-(2-acryloxyethoxy)naphthalenesulfonic acid,
Ar-(2-acryloxyethoxy)naphthalenedisulfonic acid,
Ar-(2-methacryloxyethoxy)benzenesulfonic acid,
Ar-(2-methacryloxyethoxy)naphthalenesulfonic acid,
Ar-(2-methacryloxyethoxy)naphthalenedisulfonic acid,
Ar-(3-acryloxypropoxy)benzenesulfonic acid,
Ar-(3-acryloxypropoxy)naphthalenesulfonic acid,
Ar-(3-acryloxypropoxy)naphthalenedisulfonic acid,
Ar-(3-methacryloxypropoxy)benzenesulfonic acid,
Ar-(3-methacryloxypropoxy)naphthalenesulfonic acid,
Ar-(3-methacryloxypropoxy)naphthalenedisulfonic acid,
Ar-[2-(2'-acryloxyethoxy)-ethoxy]benzenesulfonic acid,
Ar-[2-(2'-methacryloxyethoxy)-ethoxy]benzenesulfonic acid,
Ar-[2-(2'-acryloxyethoxy)-ethoxy]naphthalenesulfonic acid,
Ar-[2-(2'-acryloxyethoxy)-ethoxy]naphthalenedisulfonic acid,
Ar-[2-(3'-acryloxypropoxy)-ethoxy]benzenesulfonic acid,
Ar-[2-(3'-methacryloxypropoxy)-ethoxy]benzenesulfonic acid,
Ar-[2-(3'-methacryloxypropoxy)-ethoxy]naphthalenesulfonic acid,
Ar-[2-(2'-methacryloxypropoxy)-ethoxy]naphthalenedisulfonic acid,
Ar-[3-(2'-acryloxyethoxy)-propoxy]benzenesulfonic acid,
Ar-[3-(2'-methacryloxyethoxy)-propoxy]benzenesulfonic acid,
Ar-[3-(2'-acryloxyethoxy)-propoxy]naphthalenesulfonic acid,
Ar-[3-(2'-acryloxyethoxy)-propoxy]naphthalenedisulfonic acid,
Ar-[3-(2'-methacryloxyethoxypropoxy]naphthalenesulfonic acid,
Ar-[3-(2'-methacryloxyethoxy)-propoxy]naphthalenedisulfonic acid,
Ar-[3-(3'-acryloxypropoxy)-propoxy]benzenesulfonic acid,
Ar-[3-(3'-methacryloxypropoxy)-propoxy]benzenesulfonic acid,
Ar-[3-(3'-acryloxypropoxy)-propoxy]naphthalenesulfonic acid, Ar-[3-(3'-acryloxypropoxy)-propoxy]naphthalenedisulfonic acid,
Ar-[3-(3'-methacryloxypropoxy)-propoxy]naphthalenesulfonic acid,
Ar-[3-(3'-methacryloxypropoxy)-propoxy]naphthalenedisulfonic acid, and the like, as well as the sulfonate and disulfonate salts thereof.

The acryloxyalkoxyarylsulfonic acid compounds are readily produced by the sulfonation or disulfonation of the corresponding acryloxyalkoxyaryl compounds of the formula:

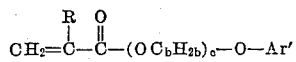

where R, $b$ and $c$ have the same meanings as hereinbefore defined and Ar' represents an unsubstituted or substituted phenyl or naphthyl nucleus. The sulfonation is carried out at about −15° C. to 20° C. in an inert organic liquid diluent or in the absence thereof, using concentrated sulfuric acid as the sulfonating agent. As is known to the ordinary chemist skilled in the art, variation in the amount of sulfuric acid used controls the degree of sulfonation obtained.

The acrylonitrile- and vinyl chloride-containing polymers of this invention are readily produced at temperatures from about 25° C. to 70° C. by any of the usual polymerization processes. Thus, bulk polymerization can be employed in which the monomers are mixed together with a catalyst and reacted at a temperature at which polymerization will occur.

Emulsion and suspension polymerization processes can also be employed. These latter processes, as is known, are carried out in aqueous medium and generally employ free-radical type catalysts and emulsifying or dispersing agents. Solution polymerization can also be used, in which case the monomers are dissolved in a suitable solvent and polymerized in contact with a catalyst; illustrative solvents are, for example, acetone, acetonitrile, N,N-dimethylformamide, N,N-dimethylacetamide, dimethyl sulfoxide, and others well known in the art. In some instances a small amount of water may be necessary to aid solution. If desired, up to about one percent or more of a chain terminator, for example, tertiary dodecyl mercaptan, 2-mercaptoethanol, thiourea, and other compounds known in the art, can be added to the polymerization reaction to assist in regulating the molecular weight of the polymer. The catalysts employed are the usual polymerization catalysts, such as the alkali metal persulfates, the peroxides, the alkali metal bisulfites, the azo-type catalysts, and the like. During the polymerization a constant ratio of the monomers preferably is maintained in the reaction mixture by the intermittent addition of the various monomers as needed to achieve polymer uniformity.

Among the emulsifying and dispersing agents which can be used one can mention the common soaps such as potassium stearate, potassium palmitate, potassium laurate; the sulfonated hydrocarbons such as sulfonated alkanes, sulfonated alkylbenzenes, sulfonated naphthalenes; the amine soaps such as the salts of triethanolamine; the salts of formaldehyde condensed alkyl aryl sulfonic acids; sulfonated succinic esters; and the like.

After the polymerization reaction is completed, the polymer is recovered and dried by conventional procedures. Either before or after recovery, one can add pigmenting agents, light stabilizers, heat stabilizers, oxidation inhibitors, etc. to the polymer.

It is well known that the copolymerization of a second monomer with acrylonitrile lowers the softening point of the fibers produced from the polymers thereof. Whereas fibers of polyacrylonitrile have a softening point greater than 300° C., fibers of a 60/40 acrylonitrile-vinylidene chloride copolymer soften at about 185° C., fibers of a 40/60 acrylonitrile-vinyl chloride copolymer soften at about 145° C., and fibers of a 70/30 acrylonitrile-vinyl chloride copolymer soften at about 220° C. A similar lowering of the softening point occurs when a third monomer is introduced into a binary system; and a 68/23/9 acrylonitrile-vinyl chloride-methyl acrylate terpolymer has a softening point of 163° C. which is lower than that of a copolymer of acrylonitrile and vinyl chloride having the same acrylonitrile content. Likewise, a 68/28/4 acrylonitrile-vinyl chloride-methyl methacrylate terpolymer softens at 214° C., which is lower than that of a copolymer of acrylonitrile and vinyl chloride having the same acrylonitrile content. Thus, it was unexpected that the addition of the acryloxyalkoxyarylsulfonic acid compounds did not lower the softening point of acrylonitrile- and vinyl chloride-containing polymers; in fact, the softening points were higher. For example, a terpolymer of acrylonitrile, vinyl chloride, and a salt of Ar-(2-methacryloxyethoxy)benzenesulfonate had a softening point about 15° C. higher than the corresponding copolymer of acrylonitrile and vinyl chloride of about the same acrylonitrile content, and a softening about 20° C. higher than the corresponding terpolymer of acrylonitrile, vinyl chloride, and methyl methacrylate of the same acrylonitrile content. This higher softening point is a distinct advantage in fibers since it permits greater latitude in processing the fibers to produce textiles and in the laundering and ironing of articles produced from said textiles. The higher softening points minimize the possibility of damage resulting from excessive heating.

The softening point of the fibers is defined as the temperature at which the stiffness of the fiber decreases to about 0.1 g.p.d. as measured by the procedure set forth by A. Brown in the Textile Research Journal 25, 891 (1955). The shrinkage measurements were obtained as part of these same measurements at the specified temperatures.

Though many of the polymers of this invention have higher softening points, they are still readily soluble in the conventional solvents used for spinning, such as, for example, acetone, acetonitrile, N,N-dimethylformamide, N,N-dimethylacetamide, gamma-butyrolactone, ethylene carbonate, ethylene carbamate, N-methyl-2-pyrrolidone, and the like, or mixtures thereof. As is known the solubility of a particular polymer in a solvent depends on the molecular weight of the polymer, the amount of each monomer polymerized therein, and the uniformity of the polymer. The fibers are then produced by conventional wet or dry spinning techniques. After stretching the fibers to orient the molecules and develop the desired tensile properties, and heat treating to improve their thermal properties, the fibers produced with the polymers of this invention can be employed in the many applications in which acrylonitrile-and vinyl chloride-containing fibers are generally employed. During the fiber-forming operations small amounts of various stabilizers, to stabilize the spinning solution or fibers against decomposition by heat, light, or oxidation, can be added; for example, the organic tin and lead salts of carboxylic acids, such as dibutyl tin dimaleate, and the like.

The average molecular weights of the polymers of this invention are measured by their specific viscosities; and the specific viscosities range from about 0.1 to 0.6, preferably from about 0.2 to 0.5. These values are determined at 20° C. using a size 100 Ubbelohde viscosimeter, and are calculated with the following formula:

Specific viscosity =
$$\frac{\text{Viscosity of a solution of 0.2 gram of resin in 100 ml of N, N-dimethylformamide}}{\text{Viscosity of N, N-dimethylformamide}} - 1.0$$

The fibers produced with the polymers of this invention are readily dyed by conventional dyeing techniques with a wide variety of dyestuffs to produce highly colored fibers of desirable properties. The fibers are dyed to deeper shades and absorb more dye from the dyebath than do the fibers from the polymers heretofore known.

This is attained even without the use of dye assistants, such as a swelling agent, in the dyebath.

The filaments, fibers, yarns, and films produced from the polymers of this invention also have good wet- and dry-tensile strengths and elongations; good flexibility, elasticity, resilience, and resistance to water and various chemical agents including acids and dilute alkalies, and to bacterial and fungal growths. The stretched and annealed or unannealed filaments and yarns have wet tenacities upwards of about 2 to 5 g.p.d. and wet elongations of from about 8 percent to 40 percent. The stretched and heat-treated filaments and yarns commonly have shrinkages of less than 5 percent in air at 150° C.

That fibers produced from the polymers of this invention are more readily dyed, and dyed to deeper shades is readily apparent from visual observation and comparison. A quantitative measurement of the amount of dyestuff absorbed by the fibers was also possible, as determined by the following procedure. A piece of the dyed and scoured fabric weighing about 0.2 gram after drying was dissolved in 50 ml. of N,N-dimethylformamide containing 0.25 ml. of acetic acid. The transmission of this solution at the appropriate wavelength was measured using a Beckman model B spectrophotometer. The amount of dyestuff in this solution, which is equal to the amount of dyestuff absorbed by the 0.2 gram sample of fabric, was read directly from a curve plotting transmission versus the concentration of dyestuff in N,N-dimethylformamide. By simple proportion the amount of dyestuff absorbed by the total weight of fabric was calculated. Then the percent of total dye available which was absorbed by the fabric is calculated by means of the equation:

$$\frac{\text{Amount of dye absorbed}}{\text{Amount of dye originally available in the dyebath}} \times 100 = \text{percent}$$

The following examples further serve to illustrate the invention but are not intended to limit it in any manner whatsoever since variations thereof would be readily apparent to the ordinary skilled scientist in the art.

A group of polymerization experiments was carried out to produce polymers free of acryloxyalkoxyarylsulfonic acid compounds for control purposes. These polymers were spun by conventional spinning procedure to produce filaments.

EXPERIMENT A

To a glass-lined autoclave having an agitator there were charged 455 parts of water, 0.39 part of di(2-ethylhexyl) sodium sulfosuccinate, 11.9 parts of vinyl chloride, 0.044 part of sulfur dioxide, 0.044 part of potassium persulfate, 0.0089 part of 2-mercaptoethanol, 17.7 parts of acrylonitrile, 0.255 part of phosphoric acid, and a trace of ferric nitrate. The contents of the reactor were heated to 60° C. and maintained at about that temperature throughout the polymerization, during which period a total of 2.7 parts of sulfur dioxide, 2.7 parts of potassium persulfate, 3.19 parts of 2-mercaptoethanol, 10,800 parts of water, 2.66 parts of phosphoric acid, 1,610 parts of acrylonitrile, 676 parts of vinyl chloride, 34.3 parts of di(2-ethylhexyl) sodium sulfosuccinate, and a trace of ferric nitrate were added. The addition of the monomers was controlled so as to maintain an approximately uniform ratio in the reactor. The latex produced was collected in receiving vessels and a fraction thereof was coagulated by the addition of nitric acid and heating at a temperature of between 100° C. to 125° C. The polymer was recovered by centrifugation, washed with water, and oven dried. There was obtained 510 parts of dried approximately 74/26 acrylonitrile-vinyl chloride copolymer having a specific viscosity of 0.378, a chlorine analysis of 16.0 percent, and a nitrogen analysis of 19.4 percent.

Five hundred parts of the above polymer was slurried in 1500 parts of acetonitrile at room temperature and 10 parts of the diglycidyl ether of Bis Phenol-A, 5 parts of dioctyl tin maleate, and 0.5 part of pyridine borane were added as heat and light stabilizers. The temperature of the slurry was raised, while agitating to 70° C., thereby solvating the resin and obtaining a homogeneous solution. The mixing vessel was then covered and the solution filtered under pressure and metered to a spinnerette having 40 holes, each 0.130 mm. in diameter. The multifilament yarn was coagulated in a 60° C. aqueous bath containing 11 percent acetonitrile. The yarn produced with withdrawn from the bath and washed with water, stretched 300 percent at a temperature of about 60° C. and then dried and annealed at temperatures up to about 150° C. The softening point of the fiber was 219° C. The properties of the yarn are summarized below.

| | |
|---|---|
| Tensile strength, g.p.d. (ASTM D1380–57T) | 2.72 |
| Elongation, percent (ASTM D1380–57T) | 20 |
| Stiffness, g.p.d. (ASTM D1380–57T) | 60.75 |
| Shrinkage, percent in: | |
| Boiling water | 4.0 |
| 150° C. air | 3.5 |

The yarn produced from the fiber was knit into a fabric and the fabric was dyed with Genacryl Pink G, Color Index 48015. The dyebath had a 3 percent dye concentration, based on the weight of the fabric, a liquor to fabric ratio of 40:1, and contained 1 percent of the sodium sulfate derivative of 7-ethyl-2-methylundecanol. After 1.5 hours at the boil, during which time constant dyebath volume was maintained, the fabric was scoured, rinsed and dried. The knitted yarn fabric from the copolymer was dyed a very light pink shade. The dye absorption value determined at a wavelength of 530 millimicrons showed that the fabric had absorbed only 6 percent of the available dye from the dyebath.

EXPERIMENT B

To a glass-lined autoclave having an agitator there were charged 450 parts of water and 0.255 part of phosphoric acid. To a second autoclave, attached in series to catch the discharge of the first, there were charged 83 parts of water and 0.0085 part of phosphoric acid. The contents of the reactors were heated to 60° C. and maintained at about that temperature throughout the polymerization, during which a total of 2.72 parts of sodium bisulfate, 2.71 parts of potassium persulfate, 2.3 parts of 2-mercaptoethanol, 8091 parts of water, 5.9 parts of phosphoric acid, 1209 parts of acrylonitrile, 345 parts of vinyl chloride, 25.9 parts of di(2-ethylhexyl) sodium sulfosuccinate and 172.7 parts of vinylidene chloride were added. The addition of monomers was controlled so as to maintain an approximately uniform ratio in the reactors. The latex produced was collected in receiving vessels and a fraction thereof was coagulated by the addition of nitric acid and heating at a temperature of between 100° C. to 125° C. The polymer was recovered by centrifugation, washed with water, and oven dried. There was obtained 1128 parts of dried approximately 68/22/10 acrylonitrile-vinyl chloride-vinylidene chloride terpolymer having a specific viscosity of 0.376, a chlorine analysis of 20.1 percent, and a nitrogen analysis of 17.7 percent.

About 300 parts of the above polymer was slurried in 900 parts of acetonitrile at room temperature and 3 parts of dioctyltin maleate and 6 parts of the diglycidyl ether of Bis Phenol-A were added as heat and light stabilizers. The temperature of the slurry was raised, while agitating to 70° C., thereby solvating the resin and obtaining a homogeneous solution. The mixing vessel was then covered and the solution filtered under pressure and metered to a spinnerette having 80 holes, each 0.130 mm. in diameter. The multifilament yarn was coagulated in a 65° C. aqueous bath containing 15 percent acetonitrile. The yarn was withdrawn from the bath and washed with water, stretched 300 percent at a temperature of about 60° C. and then dried and annealed at temperatures up to about 150° C. The properties of the yarn are summarized below.

Tensile strength, g.p.d. _____ 2.4
Elongation, percent _____ 17.8
Stiffness, g.p.d. _____ 62.4
Shrinkage, percent in:
    Boiling water _____ 4.0
    150° C. air _____ 7.0

The yarn produced from the fiber was knit into a fabric and the fabric was dyed with Genacryl Pink 3G. The dyebath had a 3 percent dye concentration, based on the weight of the fabric, a liquor to fabric ratio of 40:1, and contained 1 percent of the sodium sulfate derivative of 7-ethyl-2-methylundecanol. After 1.5 hours at the boil, during which time constant dyebath volume was maintained, the fabric was scoured, rinsed and dried. The knitted yarn fabric from the copolymer was dyed a very light pink shade. The dye absorption value determined at a wavelength of 525 millimicrons showed that the fabric had absorbed only 3.8 percent of the available dye from the dyebath. While Genacryl Pink 3G was used in Experiment B and Genacryl Pink G was used in Experiment A it is known that both dyes have about the same degree of affinity for fibers.

EXPERIMENT C

To a glass-lined autoclave having an agitator there were charged 112 parts of water and 3.5 parts of vinyl chloride. The contents of the reactor were heated to 60° C. and maintained at about that temperature throughout the polymerization, during which period a total of 5,540 parts of water, 713.7 parts of acrylonitrile, 322.8 parts of vinyl chloride, 19.1 parts of methyl methacrylate, 15.6 parts of di(2-ethylhexyl) sodium sulfosuccinate, 2.95 parts of sulfur dioxide, 2.19 parts of potassium persulfate, 1.34 parts of 2-mercaptoethanol, and a trace of ferrous sulfate were added. The addition of the monomers was controlled so as to maintain an approximately uniform ratio in the reactor. The latex produced was collected in receiving vessels and a fraction thereof was coagulated by the addition of nitric acid and heating at a temperature of between 100° C. to 125° C. The polymer was recovered by centrifugation, washed with water, and oven dried. There was obtained 70 parts of dried acrylonitrile-vinyl chloride-methyl methacrylate terpolymer having a specific viscosity of 0.416, a chlorine analysis of 17.6 percent, and a nitrogen analysis of 17.9 percent.

About 20 parts of the above polymer was slurried in 70.9 parts of acetonitrile at room temperature, and 0.2 part of diphenyl pentaerithritol diphosphite and 0.02 part of pyridine borane were added as heat and light stabilizers. The slurry was pumped to a thermal solvator operating at 80° C. wherein a homogeneous solution was obtained. The solution was metered to a spinnerette having 5000 holes each 0.1 mm. in diameter. The multifilament tow was coagulated in a 65° C. aqueous bath containing 15 percent acetonitrile. The tow was stretched 100 percent as it was washed with a dilute aqueous solution of Zelac NE, a fatty alcohol phosphate, and an alkyl phenyl polyethylene glycol ether (Tergitol NPX), stretched to a total of 435 percent in atmospheric steam and dried and annealed at temperatures up to 175° C. The softening point of the fiber was 214° C. The properties of the yarn are summarized below:

Tensile strength, g.p.d. _____ 2.56
Elongation, percent _____ 20.4
Stiffness, g.p.d. _____ 55.4
Shrinkage, percent in boiling water _____ 4.0

A knit fabric prepared from the yarn was dyed in a manner similar to that described in Experiment A and a light pink shade was obtained. The dye absorption value determined at a wavelength of 530 millimicrons showed that the fabric had absorbed only 10.6 percent of the available dye from the dyebath.

The following examples are illustrative of the compositions of this invention.

Example 1

To a stainless steel autoclave having an agitator there were charged 3200 parts of water, 540 parts of vinyl chloride, 248 parts of acrylonitrile, 12 parts of ar-(2-acryloxyethoxy)benzenesulfonic acid, 12 parts of di(2-ethylhexyl)sodium sulfosuccinate, and 0.80 part of sodium bisulfite. The contents of the sealed reactor were heated to 50° C. and maintained at about that temperature throughout the polymerization, during which period a total of 238 parts of acrylonitrile, 11.9 parts of ar-(2-acryloxyethoxy)benzenesulfonic acid, 153 parts of water, 3.6 parts of di-(2-ethylhexyl)sodium sulfosuccinate, 0.72 part of sodium bisulfite, 1.08 parts of potassium persulfate, and 0.74 part of 2-mercaptoethanol were added. The addition of the monomers was controlled so as to maintain an approximately uniform ratio in the reactor. The latex produced was coagulated by the addition of nitric acid and heating at a temperature of between 100° C. and 125° C. The polymer was recovered, washed with water, and oven dried. There was obtained 455 parts of the dried acrylonitrile-vinyl chloride-ar-(2-acryloxyethoxy) benzenesulfonic acid terpolymer having a specific viscosity of 0.287, a chlorine analysis of 17.3 percent, and a nitrogen analysis of 17.8 percent. Infrared analysis confirmed the presence of 3.2 percent of polymerized ar-(2-acryloxyethoxy)benzenesulfonic acid monomer in the polymer.

Two hundred twenty parts of the above polymer was slurried in 660 parts of acetonitrile at room temperature and 2.2 parts of dioctyl tin maleate and 4.4 parts of the diglycidyl ether of Bis Phenol-A as heat and light stabilizers. The temperature of the slurry was raised, while agitating to 70° C. thereby solvating the resin and obtaining a homogeneous solution. The mixing vessel was then covered and the solution filtered under pressure and metered to a spinnerette having 60 holes each 0.130 mm. in diameter. The multifilament yarn was coagulated in a 65° C. aqueous bath containing 15 percent acetonitrile. The yarn produced from the compositions of this invention was withdrawn from the bath and washed with a dilute aqueous solution of hydroxyethylated poly(vinyl alcohol), stretched 300 percent at a temperature of about 60° C., and then dried and annealed at temperatures up to about 150° C. The softening point of the fiber was 232° C. The properties of the yarn are summarized below:

Tensile strength, g.p.d. _____ 1.93
Elongation, percent _____ 17
Stiffness, g.p.d. _____ 61
Shrinkage, percent in:
    Boiling water _____ 5.5
    150° C. air _____ 5.1

A knit fabric prepared from the yarn was dyed in the manner described in Experiment A above, a deep red shade was obtained. The dye absorption value determined at a maximum wavelength of 530 millimicrons showed that the fabrics had absorbed 79.5 percent of the available dye from the dyebath. This indicates that dye absorption was 13.25 times as great as the control yarn of Experiment A and 7.5 times as great as the control yarn of Experiment C.

In a similar manner polymers and fibers thereof are produced by the substitution of ar-(3-acryloxypropoxy) benzenesulfonic acid, ar-[2-(2'-acryloxyethoxy)-ethoxy] benzenesulfonic acid, ar-[2-(3'-acryloxypropoxy)-ethoxy] benzenesulfonic acid, ar-[3-(2'-acryloxyethoxy)-propoxy] benzenesulfonic acid, or ar-[3-(3'-acryloxypropoxy)-propoxy]benzenesulfonic acid for the ar-(2-acryloxyethoxy)benzenesulfonic acid used. In all instances the fibers dye to deeper shades than the control.

Example 2

To a stainless steel autoclave having an agitator there were charged 540 parts of vinyl chloride, 244 parts of acrylonitrile, 16 parts of potassium ar-(2-acryloxyethoxy)benzenesulfonate, 3,200 parts of water, 8 parts of di-(2-ethylhexyl)sodium sulfosuccinate, 0.64 part of phosphoric acid, and 0.24 part of 2-mercaptoethanol. The autoclave was sealed and the contents were heated to about 50° C. and maintained at about that temperature throughout the polymerization, during which period a total of 252 parts of acrylonitrile, 4.8 parts of potassium ar-(2-acryloxyethoxy)benzenesulfonate, 152 parts of water, 2.55 parts of di-(2-ethylhexyl)sodium sulfosuccinate, 0.2 part of phosphoric acid, 0.14 part of 2-mercaptoethanol, 1.56 parts of potassium persulfate, and 1.56 parts of sodium bisulfite were added. The addition of the monomers was controlled so as to maintain an approximately constant ratio in the reactor. The latex produced was coagulated by the addition of nitric acid and heating at a temperature of between 100° C. to 125° C. The polymer was recovered, washed with water, and oven dried. There was obtained 468 parts of the dried acrylonitrile-vinyl chloride-potassium ar-(2-acryloxyethoxy)benzenesulfonate terpolymer having a specific viscosity of 0.342, a chlorine analysis of 17.6 percent and a nitrogen analysis of 17.6 percent. Infrared analysis confirmed the presence of 2.4 percent of polymerized potassium ar-(2-acryloxyethoxy)benzenesulfonate monomer in the terpolymer.

Three hundred parts of the above polymer was slurried in 1063 parts of acetonitrile at room temperature and 3 parts of dioctyl tin maleate and 6 parts of the diglycidyl ether of Bis Phenol-A were added as heat and light stabilizers. The temperature of the slurry was raised, while agitating to 70° C. thereby solvating the resin and obtaining a homogeneous solution. The mixing vessel was then covered and the solution filtered under pressure and metered to a spinnerette having 80 holes each 0.130 mm. in diameter. The multifilament yarn was coagulated in a 65° C. aqueous bath containing 15 percent acetonitrile. The yarn produced from the compositions of this invention was withdrawn from the bath and washed with a dilute aqueous solution of hydroxyethylated poly(vinyl alcohol), stretched 300 percent at a temperature of about 60° C., and then dried and annealed at temperatures up to about 150° C. The properties of the yarn are summarized below.

Tensile strength, g.p.d. _____ 1.87
Elongation, percent _____ 15
Stiffness, g.p.d. _____ 61
Shrinkage, percent in:
    Boiling water _____ 7.0
    150° C. air _____ 7.3

A knit fabric prepared from the yarn was dyed in the manner described in Experiment A above, a deep red shade was obtained. The dye absorption value determined at a maximum wavelength of 530 millimicrons showed that the fabric had absorbed 41.6 percent of the available dye from the dyebath. This indicates that dye absorption was about 6.9 times as great as the control yarn of Experiment A and 3.9 times as great as the control yarn of Experiment C.

In a similar manner polymers and fibers thereof are produced by the substitution of the lithium salt for the potassium salt. The fibers so produced also dye to deeper shades than the control.

Example 3

To a stainless steel autoclave having an agitator there were charged 540 parts of vinyl chloride, 248 parts of acrylonitrile, 12 parts of sodium ar-(2-acryloxyethoxy)benzenesulfonate, 3,200 parts of water, 12 parts of di-(2-ethylhexyl)sodium sulfosuccinate, 0.64 part of phosphoric acid, 0.666 part of 2-mercaptoethanol, and 0.8 part of sodium bisulfite. The autoclave was sealed and the contents were heated to about 50° C. and maintained at about that temperature throughout the polymerization, during which period a total of 247 parts of acrylonitrile, 3.6 parts of sodium ar-(2-acryloxyethoxy)benzenesulfonate, 125 parts of water, 3.75 parts of di-(2-ethylhexyl)sodium sulfosuccinate, 0.2 part of phosphoric acid, 0.207 part of 2-mercaptoethanol, 1.59 parts of potassium persulfate, and 1.59 parts of sodium bisulfite were added. The addition of monomers was controlled so as to maintain an approximately constant ratio in the reactor. The latex produced was coagulated by the addition of nitric acid and heating at a temperature of between 100° C. to 125° C. The polymer was recovered, washed with water, and oven dried. There was obtained 400 parts of the dried acrylonitrile-vinyl chloride-sodium ar-(2-acryloxyethoxy)benzenesulfonate terpolymer having a specific viscosity of 0.260, a chlorine analysis of 15.7 percent, and a nitrogen analysis of 18.4 percent. Infrared analysis confirmed the presence of 2.7 percent of polymerized sodium ar-(2-acryloxyethoxy)benzenesulfonate monomer in the terpolymer.

Three hundred parts of the above polymer was slurried in 1063 parts of acrylonitrile at room temperature and 6 parts of dioctyl tin was added. The temperature of the slurry was raised, while agitating to 70° C. thereby solvating the resin and obtaining a homogeneous solution. The mixing vessel was then covered and the solution filtered under pressure and metered to a spinnerette having 80 holes each 0.130 mm. in diameter. The multifilament yarn was coagulated in a 65° C. aqueous bath containing 15 percent acetonitrile. The yarn produced from the compositions of this invention was withdrawn from the bath and washed with a dilute aqueous solution of hydroxyethylated poly(vinyl alcohol), stretched 300 percent at a temperature of about 60° C. and then dried and annealed at temperatures up to about 150° C. The softening point of the fiber was 237° C. The properties of the yarn are summarized below.

Tensile strength, g.p.d. _____ 2.15
Elongation, percent _____ 20
Stiffness, g.p.d. _____ 61
Shrinkage, percent in:
    Boiling water _____ 2.5
    150° C. air _____ 3.3

A knit fabric prepared from the yarn was dyed in the manner described in Experiment A above, a deep red shade was obtained. The dye absorption value determined at a maximum wavelength of 530 millimicrons showed that the fabric had absorbed 95.6 percent of the available dye from the dyebath. This indicates that dye absorption was about 16 times as great as the control yarn of Experiment A and 9 times as great as the control yarn of Experiment C.

In a similar manner polymers and fibers thereof are produced by the substitution of the ammonium salt for the sodium salt. The fibers so produced also dye to deeper shades than the control.

Example 4

To a stainless steel autoclave having an agitator there were charged 540 parts of vinyl chloride, 254 parts of acrylonitrile, 5.6 parts of ar-(2-methacryloxyethoxy)benzenesulfonic acid, 3,200 parts of water, 12 parts of di-(2-ethylhexyl)sodium sulfosuccinate, 0.22 part of 2-mercaptoethanol, and 0.5 part of sodium bisulfite. The autoclave was sealed and the contents were heated to about 50° C. and maintained at about that temperature throughout the polymerization, during which period a total of 247 parts of acrylonitrile, 4.08 parts of ar-(2-methacryloxyethoxy)benzenesulfonic acid, 204 parts of water, 3.6 parts of di-(2-ethylhexyl)sodium sulfosuccinate, 0.2 part of 2-mercaptoethanol, 2.4 parts of potassium persulfate, and 1.8 parts of sodium bisulfite were added. The addition of monomers was controlled so as to maintain an approximately constant ratio in the reactor. The latex produced was coagulated by the addition of nitric acid and heating at a temperature of between 100° C. to 125° C. The polymer was recovered, washed with water, and oven dried. There was obtained 442 parts of the dried acrylonitrile-vinyl chloride-ar-(2-methacryloxyethoxy)-benzenesulfonic acid terpolymer having a specific viscosity of 0.344. The polymer is readily spun into fiber.

In a similar manner polymers and fibers thereof are produced by the substitution of ar-(3-methacryloxypropoxy)benzenesulfonic acid, ar-[2-(2'-methacryloxyethoxy)-ethoxy]benzenesulfonic acid, ar-[2-(3'-methacryloxypropoxy)-ethoxy]benzenesulfonic acid, ar-[3-(2'-methacryloxyethoxy)-propoxy]benzenesulfonic acid, or ar-[3-(3'-methacryloxypropoxy)-propoxy]benzenesulfonic acid for the ar-(2-methacryloxyethoxy)benzenesulfonic acid.

Example 5

To a glass-lined autoclave having an agitator there were charged 112 parts of water, 3.5 parts of vinyl chloride, and a slight trace of sulfuric acid. The autoclave was sealed and the contents were heated to about 60° C. and maintained at about that temperature throughout the polymerization, during which period a total of 8,534 parts of water, 868 parts of acrylonitrile, 390 parts of vinyl chloride, 21 parts of sodium ar-(2-methacryloxyethoxy)benzenesulfonate, 19 parts of di-(2-ethylhexyl)-sodium sulfosuccinate, 4.5 parts of sulfur dioxide, 2.79 parts of potassium persulfate, 1.24 parts of 2-mercaptoethanol, and 0.0129 part of ferrous sulfate were added. The addition of monomers was controlled so as to maintain an approximately constant ratio in the reactor. The latex produced was collected in receiving vessels and portions thereof were coagulated by the addition of nitric acid and heating at a temperature of between 100° C. to 125° C. The polymer was recovered, washed with water, and oven dried. There was obtained 445 parts of the dried acrylonitrile-vinyl chloride-sodium ar-(2-methacryloxyethoxy)benzenesulfonate terpolymer having a specific viscosity of 0.383, a chlorine analysis of 18 percent, and a nitrogen analysis of 17.4 percent. Infrared analysis confirmed the presence of 2.5 percent of polymerized sodium ar-(2-methacryloxyethoxy)benzenesulfonate monomer in the terpolymer.

A 14.8 parts portion of the above polymer was slurried in 47.5 parts of acetonitrile at room temperature and 0.15 part of diphenyl pentaerithritol diphosphite and 0.015 part of pyridine borane were added as heat and light stabilizers. The slurry was pumped to a thermal solvator operating at 80° C. wherein a homogeneous solution was obtained. The solution was metered to a spinnerette having 5000 holes each 0.1 mm. in diameter. The multifilament tow was coagulated in a 65° C. aqueous bath containing 15 percent acetonitrile. The tow was stretched 100 percent as it was washed with a dilute aqueous solution of Zelac NE, a fatty alcohol phosphate and an alkyl phenyl polyethylene glycol ether, stretched to a total of 435 percent in atmospheric steam, and dried and annealed at temperatures up to 175° C. The softening point of the fiber was 234° C. The properties of the yarn are summarized below:

Tensile strength, g.p.d. _____ 3.24
Elongation, percent _____ 22.4
Stiffness, g.p.d. _____ 54
Shrinkage, percent in boiling water _____ 1.4

A knit fabric prepared from the yarn was dyed in the manner described in Experiment A above; a deep red shade was obtained. The dye absorption value determined at a maximum wavelength of 530 millimicrons showed that the fabric had absorbed 83.3 percent of the available dye from the dyebath. This indicates that dye absorption was about 14 times as great as the control yarn of Experiment A and 7.8 times as great as the control yarn of Experiment C.

In a similar manner polymers and fibers thereof are produced by the substitution of the ammonium, lithium, or potassium salt. The fibers so produced also dye to deeper shades than the control.

Example 6

To a stainless steel autoclave having an agitator there were charged 544 parts of vinyl chloride, 240 parts of acrylonitrile, 16 parts of potassium ar-(2-methacryloxyethoxy)naphthalenesulfonate, 3,200 parts of water, 12 parts of di-(2-ethylhexyl)sodium sulfosuccinate, 0.28 part of 2-mercaptoethanol, and 0.0012 part of ferrous sulfate. The autoclave was sealed and the contents were heated to about 50° C. and maintained at about that temperature throughout the polymerization, during which period a total of 103 parts of acrylonitrile, 2 parts of potassium ar-(2-methacryloxyethoxy)naphthalenesulfonate, 297 parts of water, 1.6 parts of di-(2-ethylhexyl)sodium sulfosuccinate, 0.35 part of 2-mercaptoethanol, 0.00015 part of ferrous sulfate, 3.98 parts of potassium persulfate, and 6.06 parts of sulfur dioxide were added. The addition of monomers was controlled so as to maintain an approximately constant ratio in the reactor. The latex produced was coagulated by the addition of nitric acid and heating at a temperature of between 100° C. to 125° C. The polymer was recovered, washed with water and oven dried. There was obtained 278 parts of the dried acrylonitrile-vinyl chloride-potassium ar-(2-methacryloxyethoxy)naphthalenesulfonate terpolymer having a specific viscosity of 0.357, a chlorine analysis of 16.6 percent, and a nitrogen analysis of 17.6 percent.

A film cast from an N,N-dimethylformamide solution of the above polymer was boiled for 90 minutes in a dyebath containing 3 percent, based on the weight of the film, of Genacryl Pink G. The film, after washing and drying was found to have absorbed 86 percent of the available dye from the dyebath. A film prepared in the same manner from a 71/29 acrylonitrile-vinyl chloride copolymer absorbed only 6 percent of the available dye from the dyebath. This indicates that dye absorption was about 14.3 times as great for the polymer of this invention.

In a similar manner polymers, films, and fibers thereof are produced by the substitution of ar-(2-acryloxyethoxy)naphthalenesulfonic acid, ar-(3-acryloxypropoxy)naphthalenesulfonic acid, ar-[2-(3'-methacryloxypropoxy)-ethoxy]naphthalenesulfonic acid, ar-[3-(2-acryloxyethoxy)-propoxy]naphthalenesulfonic acid, ar-[3-(3'-methacryloxy)-propoxy]naphthalenesulfonic acid, or their respective ammonium, sodium, or potassium salts for the potassium ar-(2-methacryloxyethoxy)naphthalenesulfonic acid used. In all instances the film or fibers dye to deeper shades than the control.

Example 7

To a stainless steel autoclave having an agitator there were charged 554 parts of vinyl chloride, 240 parts of acrylonitrile, 16 parts of potassium ar-(2-methacryloxyethoxy)napththalenedisulfonate, 3,200 parts of water, 12 parts of di-(2-ethylhexyl)sodium sulfosuccinate, 0.28 part of 2-mercaptoethanol, and 0.0012 part of ferrous sulfate. The autoclave was sealed and the contents were heated to about 50° C. and maintained at about the temperature throughout the polymerization, during which period a total of 236 parts of acrylonitrile, 5 parts of potassium ar-(2-methacryloxyethoxy)naphthalenedisulfonate, 160 parts of water, 3.6 parts of di(2-ethylhexyl)sodium sulfosuccinate, 0.088 part of 2-mercaptoethanol, 1.46 parts of potassium persulfate, 2.25 parts of sulfur dioxide, and a trace of ferrous sulfate were added. The addition of monomers was controlled so as to maintain an approximately constant ratio in the reactor. The latex produced was coagulated by the addition of nitric acid and heating at a temperature of between 100° C. to 125° C. The polymer was recovered, washed with water and oven dried. There was obtained 436 parts of the dried acrylonitrile-vinyl chloride-potassium ar - (2 - methacryloxyethoxy) naphthalenedisulfonate terpolymer having a specific viscosity of 0.543, a chlorine analysis of 16.1 percent, and a nitrogen analysis of 17.0 percent.

A film cast from an N,N-dimethylformamide solution was dyed as described in Example 6. The film had absorbed 69.4 percent of the available dye from the dyebath, as compared to 6 percent for the control. This indicates that dye absorption was about 11.5 times as great for the polymer of this invention.

In a similar manner polymers, film, and fibers thereof are produced by the substitution of ar-(acryloxymethoxy)-naphthalenedisulfonic acid, ar - (2 - acryloxyethoxy)-naphthalenedisulfonic acid, ar - (3 - methacryloxypropoxy) naphthalenedisulfonic acid, ar - [2 - (2' - acryloxyethoxy) ethoxy] naphthalenedisulfonic acid, ar - [3 - (2'-methacryloxyethoxy) - propoxy] naphthalenedisulfonic acid, ar - [3 - (3' - acryloxypropoxy) - propoxy] naphthalenedisulfonic acid, or their respective ammonium, lithium, sodium, or potassium salts for the potassium ar - (2-methacryloxyethoxy) naphthalenedisulfonate used. In all instances the films or fibers dye to deeper shades than the control.

*Example 8*

To a stainless steel autoclave having an agitator there were charged 440 parts of vinyl chloride, 320 parts of acrylonitrile, 40 parts of vinylidene chloride, 12 parts of potassium ar - (2 - acryloxyethoxy) benzenesulfonate, 3,200 parts of water, 4 parts of di-(2-ethylhexyl) sodium sulfosuccinate, 0.64 part of phosphoric acid, 1.12 parts of sodium bisulfite, and 0.88 part of 2-mercaptoethanol. The autoclave was sealed and the contents were heated to about 50° C. and maintained at about that temperature throughout the polymerization, during which period a total of 260 parts of acrylonitrile, 31 parts of vinylidene chloride, 0.94 part of potassium ar-(2-acryloxyethoxy)-benzenesulfonate, 195 parts of water, 1.46 parts of di-(2-ethylhexyl) sodium sulfosuccinate, 0.23 part of phosphoric acid, 3.26 parts of potassium persulfate, 0.5 part of sodium metabisulfite, and 0.38 part of 2-mercaptoethanol were added. The addition of monomers was controlled so as to maintain an approximately constant ratio in the reactor. The latex produced was coagulated by the addition of nitric acid and heating at a temperature of between 100° C. to 125° C. The polymer was recovered, washed with water, and oven dried. There was obtained 517 parts of the dried acrylonitrile-vinyl chloride-vinylidene chloride-potassium ar - (2 - acryloxyethoxy) benzenesulfonate quadripolymer having a specific viscosity of 0.480.

A film cast from N,N-dimethylformamide solution of the above polymer was boiled for 90 minutes in a dyebath containing 3 percent, based on the weight of the film, of Genacryl Pink 3G. The film after washing and drying was found to have absorbed 30.1 percent of the available dye from the dyebath. A film prepared from a 70/20/10 acrylonitrile-vinyl chloride-vinylidene chloride-terpolymer absorbed only 10.7 percent of the available dye from the dyebath. This indicates that dye absorption was about 2.8 times as great for the polymer of this invention.

In a similar manner polymers and fibers thereof are produced by the substitution of ar-(3-methacryloxypropoxy) benzenesulfonic acid, ar-[2-(2'-methacryloxyethoxy)-ethoxy]-benzenesulfonic acid, ar-[2-(3'-methacryloxypropoxy)-ethoxy]-benzenesulfonic acid, ar-[3-(3'-methacryloxyethoxy)-propoxy]-benzenesulfonic acid, ar-(2 - acryloxyethoxy) naphthalenesulfonic acid, ar - (2 - methacryloxyethoxy) naphthalenedisulfonic acid, ar - (3 - acryloxypropoxy) benzenesulfonic acid, ar-(3 - methacryloxypropoxy) naphthalenesulfonic acid, ar-[2-(2'-acryloxyethoxy)-ethoxy] naphthalenedisulfonic acid, ar-[3-(2'-acryloxyethoxy)-propoxy] benzenesulfonic acid, ar-[3-(3'-acryloxypropoxy) - propoxy] naphthalenedisulfonic acid, or the cationic salts thereof for the potassium ar-(2-acryloxyethoxy) benzenesulfonate used.

*Example 9*

To a glass-lined autoclave having an agitator there were charged 440 parts of vinyl chloride, 320 parts of acrylonitrile, 40 parts of vinylidene chloride, 12 parts of sodium ar-(2-acryloxyethyl) benzenesulfonate, 3,200 parts of water, 12 parts of di-(2-ethylhexyl) sodium sulfosuccinate, 0.64 part of phosphoric acid, 0.72 part of 2-mercaptoethanol, and 1.12 parts of sodium bisulfite. The autoclave was sealed and the contents were heated to about 50° C. and maintained at that temperature throughout the polymerization, during which period a total of 257 parts of acrylonitrile, 30.6 parts of vinylidene chloride, 4.37 parts of sodium ar-(2-acryloxyethoxy) benzenesulfonate, 155 parts of water, 4.3 parts of di-(2-ethylhexyl) sodium sulfosuccinate, 0.23 part of phosphoric acid, 0.27 part of 2-mercaptoethanol, 0.5 part of sodium bisulfite, and 0.27 part of potassium persulfate were added. The addition of monomers was controlled so as to maintain an approximately constant ratio in the reactor. The latex produced was coagulated by the addition of nitric acid and heating at a temperature of between 100° C. to 125° C. The polymer was recovered, washed with water, and oven dried. There was obtained 475 parts of the dried acrylonitrile-vinyl chloride-vinylidene chloride-sodium ar-(2-acryloxyethoxy) benzenesulfonate quadripolymer having a specific viscosity of 0.440, a chlorine analysis of 19.8 percent, and a nitrogen analysis of 18 percent.

Three hundred parts of the above polymer was slurried in 1063 parts of acetonitrile at room temperature and 3 parts of dioctyl tin maleate and 6 parts of the diglycidyl ether of Bis Phenol-A were added as heat and light stabilizers. The temperature of the slurry was raised, while agitating to 70° C. thereby solvating the resin and obtaining a homogeneous solution. The mixing vessel was then covered and the solution filtered under pressure and metered to a spinnerette having 80 holes each 0.130 mm. in diameter. The multifilament yarn was coagulated in a 65° C. aqueous bath containing 15 percent acetonitrile. The yarn produced from the compositions of this invention was withdrawn from the bath and washed with a dilute aqueous solution of hydroxyethylated poly(vinyl alcohol), stretched 300 percent at a temperature of about 60° C., and then dried and annealed at temperatures up to about 150° C.

A knit fabric prepared from the yarn was dyed in the manner described in Experiment A above, but using Genacryl Pink 3G. A deep red shade was obtained, and the dye absorption valve determined at a maximum wavelength of 525 millimicrons showed that the fabric had absorbed 61 percent of the available dye from the dyebath.

*Example 10*

To a glass-lined autoclave having an agitator there were charged 100 parts of water, 0.7 part of dihexyl sodium sulfosuccinate, 0.3 part of di(2-ethylhexyl) sodium sulfosuccinate, 4.5 parts of vinyl chloride, 0.099 part acetic acid, 0.25 part of sulfur dioxide, 0.008 part of potassium persulfate, 0.74 part of acrylonitrile, 0.124 part of sodium ar-(2-methacryloxyethoxy) benzenesulfonate and a trace of ferrous sulfate. The contents of the reactor were heated to 35° C. and maintained at about that temperature throughout the polymerization, during which a total of 0.052 part of potassium persulfate, 3.83 parts of water, 9.4 parts of acrylonitrile, 0.237 part of acetic acid, 15.3 parts of vinyl chloride, 0.296 part of sodium ar-(2-methacryloxyethoxy) benzenesulfonate were added. The addition of monomers was controlled so as to maintain an approximately uniform ratio in the reactor. The latex produced was collected in receiving vessels and a fraction thereof was coagulated by the addition of calcium chloride and heating at a temperature of between 95° C. to 100° C. The polymer was recovered by centrifugation, washed with water, and oven dried. There was obtained 14.8 parts of dried polymer having a specific viscosity of 0.250 and a chlorine analysis of 37.5 percent.

About 28 parts of the above polymer was slurried in 64 parts of acetone at −15° C. and 0.56 part of triisooctyl phosphite and 0.56 part of propylene oxide were added as heat and light stabilizers. The temperature of the slurry was raised to 100° C., thereby solvating the resin and obtaining a homogeneous solution. The solution was filtered under pressure and metered to a spinnerette having 5000 holes, each 0.10 mm. in diameter. The multifilament yarn was coagulated in a 45° C. aqueous bath containing 7 percent acetone, drawn through a 70° C. aqueous bath, dried at temperatures of 75° C. to 130° C., steam stretched 900 percent and finally annealed at temperatures up to about 160° C. The properties of the yarn are summarized below:

Tensile strength, g.p.d. _____ 2.03
Elongation, percent _____ 41.1
Stiffness, g.p.d. _____ 40.5
Shrinkage, percent in boiling water _____ 2.4

The yarn produced from the fiber was dyed with Sevron Red GL. The dyebath had a 2 percent dye concentration, based on the weight of the fabric, a liquor to fabric ratio of 30:1, and contained 0.5 percent of an alkyl phenyl polyethylene glycol ether (Tergitol NP-40). After 1.5 hours at the boil, during which time constant dyebath volume was maintained, the fabric was scoured, rinsed and dried. The yarn from the terpolymer was dyed a medium-deep shade. A control yarn prepared from an acrylonitrile vinyl chloride copolymer of the same acrylonitrile content gave only a light shade when dyed in the same manner as the yarn from the terpolymer.

The following experiments are illustrative of the procedures by which the acryloxyalkoxyarylsulfonic acid compounds can be produced:

EXPERIMENT I

To a 500 ml. flask equipped with a stirrer and thermometer there were charged 40 parts of 2-phenoxyethyl acrylate, 160 parts of acetonitrile, and 44 parts of acetic anhydride. The reaction mixture was cooled to 5° C. and 20.5 parts of concentrated 98 percent sulfuric acid was added in a dropwise manner over a twenty minute period. The reaction mixture was stirred at about 5° C. for an additional three hours. The free acid ar-(2-acryloxyethoxy)benzenesulfonic acid is recovered by concentrating the solution. Alternately, the corresponding ammonium or alkali metal salts can be obtained by neutralization with the appropriate base by procedures well known to the ordinary scientist skilled in the art.

EXPERIMENT II

To a Pyrex flask were charged 10 parts of 2-o-nitrophenoxyethyl acrylate, 40 parts of acetonitrile, and 10 parts of acetic anhydride. The reaction mixture was cooled to 5° C. and 4.14 parts of concentrated 98 percent sulfuric acid was added in a dropwise manner over a twenty minute period. The reaction mixture was stirred at about 5° C. for an additional three hours, and then 4.41 parts of potassium acetate was added. The precipitated potassium ar-(2-acryloxyethoxy)nitrobenzenesulfonate was filtered off and dried.

EXPERIMENT III

To a Pyrex flask were charged 10 parts of 2-p-t-butylphenoxyethyl acrylate, 40 parts of acetonitrile, and 11 parts of acetic anhydirde. The reaction mixture was cooled to 5° C. and 3.98 parts of concentrated 98 percent sulfuric acid was added in a dropwise manner over a twenty minute period. The reaction mixture was stirred at about 5° C. for an additional three hours and then about 4 parts of potassium acetate was added. The precipitated potassium ar-(2-acryloxyethoxy)p-t-butylbenzenesulfonate was filtered off and dried.

EXPERIMENT IV

To a Pyrex flask were charged 91 parts of 2-phenoxyethyl methacrylate, and 94.5 parts of acetic anhydride. The mixtxure was cooled to 5° C. and 43.3 parts of concentrated 98 percent sulfuric acid was added in a dropwise manner over a twenty minute period. The reaction mixture was stirred at about 5° C. for an additional three hours. The free acid ar-(2-methacryloxyethoxy)benzenesulfonic acid was recovered by concentrating a small portion of the reaction mixture. The bulk of the reaction mixture was neutralized with 225 parts of a 7.9 percent aqueous sodium hydroxide solution added at a temperature of from 7° C. to 21° C. to produce the sodium ar-(2-methacryloxyethoxy)benzenesulfonate salt, which could be isolated either by concentrating the solution or precipitating it out of solution by the addition of sodium chloride.

Among the dyestuffs which can be used to dye the polymers of this invention one can mention the Genacryl dyes discussed on pages 432 to 433 of the American Dyestuff Reporter, volume 43, 1954, for example, Genacryl Red 6B (a basic dye of the quaternary ammonium type), Genacryl Pink G (Basic Red 13; Color Index No. 48015), Genacryl Blue 6G; Celliton Fast Blue AF Ex. Conc. (Disperse Blue 9; Color Index No. 61115); Celliton Fast Red GGA Ex. Conc. (Disperse Red 17; Color Index No. 11210); Fuchsine SBP (a basic dye of the triphenylmethane type); Fuchsine Conc. Basic Violet 14 (Color Index No. 12510); Methyl Violet 2B; Brilliant Blue 6G; Methylene Blue SP; Victoria Green WB (Color Index No. 657); Victoria Green (Basic Green 4; Color Index No. 42000); Rhodamine B (Color Index No. 749); Brilliant Green B (Color Index No. 662); Sevron Brilliant Red 4G; Maxilon Red BL; Basacryl Blue GL; and the like.

What is claimed is:

1. An acrylonitrile- and vinyl chloride-containing solid polymer containing in the molecule from about 35 to 75 percent by weight of polymerized acrylonitrile, from about 10 to 60 percent by weight of polymerized vinyl chloride, and from about 0.5 to 10 percent by weight of a polymerized acryloxyalkoxyarylsulfonic acid compound represented by the general formula:

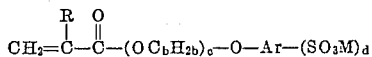

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent.

2. An acrylonitrile- and vinyl chloride-containing solid polymer containing in the molecule from about 35 to 75 percent by weight of polymerized acrylonitrile, from about 10 to 60 percent by weight of polymerized vinyl chloride, from about 5 to 20 percent by weight of polymerized vinylidene chloride, and from about 0.5 to 10 percent by weight of a polymerized acryloxyalkoxyarylsulfonic acid compound represented by the general formula:

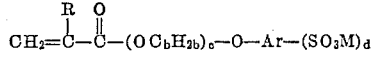

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent.

3. An acrylonitrile- and vinyl chloride-containing solid polymer containing in the molecule from about 60 to 75 percent by weight of polymerized acrylonitrile, from about 20 to 39 percent by weight of polymerized vinyl chloride, and from about 1 to 10 percent by weight of a polymerized acryloxyalkoxyarylsulfonic acid compound represented by the general formula:

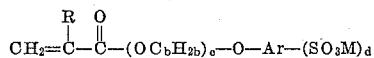

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent.

4. An acrylonitrile- and vinyl chloride-containing solid polymer containing in the molecule from about 60 to 75 percent by weight of polymerized acrylonitrile, from about 20 to 39 percent by weight of polymerized vinyl chloride, and from about 1 to 3 percent by weight of a polymerized acryloxyalkoxyarylsulfonic acid compound represented by the general formula:

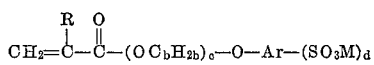

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent.

5. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized ar-(2-acryloxyethoxy)-benzenesulfonic acid; the sum of all of the copolymerized monomers being 100 percent.

6. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized sodium ar-(2-acryloxyethoxy)benzenesulfonate; the sum of all of the copolymerized monomers being 100 percent.

7. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized ar-(2-methacryloxyethoxy)benzenesulfonic acid; the sum of all of the copolymerized monomers being 100 percent.

8. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized sodium ar-(2-methacryloxyethoxy)benzenesulfonate; the sum of all of the copolymerized monomers being 100 percent.

9. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized potassium ar-(2-methacryloxyethoxy)naphthalenesulfonate the sum of all of the copolymerized monomers being 100 percent.

10. A solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized potassium ar-(2-methacryloxyethoxy)naphthalenedisulfonate; the sum of all the copolymerized monomers being 100 percent.

11. A solid tetrapolymers containing in the molecule from about 35 to 75 percent by weight of polymerized acrylonitrile, from about 10 to 60 percent by weight of polymerized vinyl chloride, from about 5 to 20 percent by weight of polymerized vinylidene chloride, and from about 0.5 to 10 percent by weight of polymerized sodium ar-(2-acryloxyethoxy)benzenesulfonate; the sum of all of the copolymerized monomers being 100 percent.

12. A stretched textile article of the class consisting of filaments, fibers and yarns composed of an acrylonitrile- and vinyl chloride-containing solid polymer containing in the molecule from about 35 to 75 percent by weight of polymerized acrylonitrile, from about 10 to 60 percent by weight of polymerized vinyl chloride, and from about 0.5 to 10 percent by weight of a polymerized acryloxyalkoxyarylsulfonic acid compound represented by the general formula:

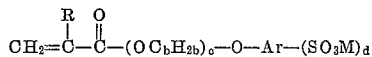

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent; and said polymer having a specific viscosity within the range between 0.1 and 0.6.

13. A stretched textile article of the class consisting of filaments, fibers and yarns composed of an acrylonitrile- and vinyl chloride-containing solid polymer containing in the molecule from about 35 to 75 percent by weight of polymerized acrylonitrile, from about 10 to 60 percent by weight of polymerized vinyl chloride, from about 5 to 20 percent by weight of polymerized vinylidene chloride, and from about 0.5 to 10 percent by weight of a polymerized acryloxyalkoxyarylsulfonic acid compound represented by the general formula:

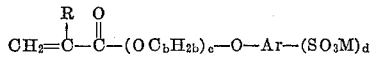

wherein R represents a member selected from the group consisting of a hydrogen atom and a methyl radical; Ar represents a member selected from the group consisting of a phenylene radical and a naphthylene radical; M represents a member selected from the group consisting of a hydrogen atom, an ammonium radical and a monovalent alkali metal; b is an integer having a value of from 1 to about 3; c is an integer having a value of 1 and 2; and d is an integer having a value of 1 and 2; the sum of all of the copolymerized monomers being 100 percent; and said polymer having a specific viscosity within the range between 0.1 and 0.6.

14. A stretched textile article of the class consisting of filaments, fibers and yarns composed of a solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized sodium ar-(2-acryloxyethoxy)benzenesulfonate; the sum of all of the copolymerized monomers being 100 percent; and said polymer having a specific viscosity within the range between 0.1 and 0.6.

15. A stretched textile article of the class consisting of filaments, fibers and yarns composed of a solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized sodium ar-(2-methacryloxyethoxy)benzenesulfonate; the sum of all of the copolymerized monomers being 100 percent; and said polymer having a specific viscosity within the range between 0.1 and 0.6.

16. A stretched textile article of the class consisting of filaments, fibers and yarns composed of a solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized potassium ar-(2-methacryloxyethoxy)naphthalenesulfonate; the sum of all of the copolymerized monomers being 100 percent; and said polymer having a specific viscosity within the range between 0.1 and 0.6.

17. A stretched textile article of the class consisting of filaments, fibers and yarns composed of a solid terpolymer containing in the molecule from about 35 to 75 percent by weight of polymerized acrylonitrile, from about 10 to 60 percent by weight of polymerized vinyl chloride, and from about 0.5 to 10 percent by weight of polymerized potassium ar-(2-methacryloxyethoxy)naphthalenedisulfonate; the sum of all of the copolymerized monomers being 100 percent; and said polymer having a specific viscosity within the range between 0.1 and 0.6.

18. A stretched textile article of the class consisting of filaments, fibers and yarns composed of a solid tetrapolymer containing in the molecule from about 35 to 75 percent by weight of polymerized acrylonitrile, from about 10 to 60 percent by weight of polymerized vinyl chloride, from about 5 to 20 percent by weight of polymerized vinylidene chloride, and from about 0.5 to 10 percent by weight of polymerized sodium ar-(2-acryloxyethoxy)benzenesulfonate; the sum of all of the copolymerized monomers being 100 percent; and said polymer having a specific viscosity within the range between 0.1 and 0.6.

No references cited.

UNITED STATES PATENT OFFICE
CERTIFICATE OF CORRECTION

Patent No. 3,053,806                      September 11, 1962

Edward M. La Combe et al.

It is hereby certified that error appears in the above numbered patent requiring correction and that the said Letters Patent should read as corrected below.

Column 6, line 9, for "with" read -- was --; line 45, for "bisulfate" read -- bisulfite --; column 8, line 62, for "fabrics" read -- fabric --; column 12, line 53, for "film" read -- films --; column 14, line 51, for "valve" read -- value --; column 15, line 68, for "anhydirde" read -- anhydride --; column 16, line 4, for "mixtxure" read -- mixture --; column 18, line 14, for "tetrapolymers" read -- tetrapolymer --.

Signed and sealed this 26th day of March 1963.

(SEAL)
Attest:

ESTON G. JOHNSON                      DAVID L. LADD

Attesting Officer                       Commissioner of Patents